United States Patent
Herrig et al.

(10) Patent No.: US 10,626,846 B2
(45) Date of Patent: Apr. 21, 2020

(54) SYSTEM FOR WIND TURBINE BLADE ACTUATION

(71) Applicant: General Electric Company, Schenectady, NY (US)

(72) Inventors: Andreas Herrig, Garching bei München (DE); Dominic Alexander von Terzi, Forstern (DE); Shivaram Ac, Bangalore (IN); Vidyashankar Ramasastry Buravalla, Bangalore (IN); Norman Arnold Turnquist, Carlisle, NY (US)

(73) Assignee: General Electric Company, Schenectady, NY (US)

(*) Notice: Subject to any disclaimer, the term of this patent is extended or adjusted under 35 U.S.C. 154(b) by 400 days.

(21) Appl. No.: 15/354,169

(22) Filed: Nov. 17, 2016

(65) Prior Publication Data
US 2018/0135596 A1 May 17, 2018

(51) Int. Cl.
*F03D 7/02* (2006.01)
*F03D 1/06* (2006.01)
*F03D 80/70* (2016.01)

(52) U.S. Cl.
CPC ......... *F03D 1/0675* (2013.01); *F03D 7/0228* (2013.01); *F05B 2220/706* (2013.01);
(Continued)

(58) Field of Classification Search
CPC ...... F03D 1/0675; F03D 7/0228; F03D 7/022; F03D 7/0252; F03D 1/0633;
(Continued)

(56) References Cited

U.S. PATENT DOCUMENTS 4,798,051 A * 1/1989 Foote ............... F03G 7/065 60/527
5,127,228 A * 7/1992 Swenson ........... F03G 7/065 60/527

(Continued)

FOREIGN PATENT DOCUMENTS

EP 2423104 A1 2/2012
EP 2771238 B1 8/2015

(Continued)

OTHER PUBLICATIONS

Supeni et al., "Development of Smart Wind Turbine Blades", 8th Asian-Australasian Conference on Composite Materials, Nov. 6-8, 2012, Kuala Lumpur, Malaysia.

(Continued)

*Primary Examiner* — David Hamaoui
*Assistant Examiner* — John D Bailey
(74) *Attorney, Agent, or Firm* — Mary Louise Stanford (57) ABSTRACT

A wind turbine blade includes a first blade segment and a second blade segment extending in opposite directions from a chord-wise joint. Each of the blade segments having a pressure side shell member, a suction side shell member. The blade further including a coupling component extending spanwise and structurally connecting the first blade segment and the second blade segment. A thermal actuation component is coupled to the coupling component and passively actuated in response to a change in thermal conditions so as to provide for aeroelastic tailoring and pitch control to the wind turbine blade.

12 Claims, 8 Drawing Sheets

(52) U.S. Cl.
CPC ....... *F05B 2240/31* (2013.01); *F05B 2240/50* (2013.01); *F05B 2260/507* (2013.01); *F05B 2260/79* (2013.01); *F05B 2280/5002* (2013.01); *F05B 2280/5006* (2013.01); *Y02E 10/721* (2013.01); *Y02E 10/723* (2013.01)

(58) Field of Classification Search
CPC .............. F03D 7/0224; F05B 2220/706; F05B 2240/31; F05B 2240/50; F05B 2260/507; F05B 2260/709; F05B 2280/5002; F05B 2280/5006; F05B 2240/311; F05B 2270/32; F05B 2240/30; F05B 2260/901; F05B 2210/16; F05B 2260/70; F05B 2270/1095; F05B 2270/327; Y02E 10/721; Y02E 10/723; F16C 23/045
USPC ....... 416/39, 23, 1, 147, 31, 37, 132 B, 155, 416/36, 223 R; 244/201, 133, 99.8; 415/12
See application file for complete search history.

(56) References Cited

U.S. PATENT DOCUMENTS

| | | | |
|---|---|---|---|
| 5,150,864 A * | 9/1992 | Roglin | B64C 3/44 244/17.25 |
| 5,505,589 A | 4/1996 | Bergey | |
| 5,662,294 A * | 9/1997 | Maclean | B63B 1/28 114/140 |
| 6,065,934 A * | 5/2000 | Jacot | F03G 7/065 244/99.8 |
| 6,322,324 B1 * | 11/2001 | Kennedy | B64C 27/001 244/17.13 |
| 6,419,187 B1 | 7/2002 | Buter et al. | |
| 6,465,902 B1 * | 10/2002 | Beauchamp | F01D 5/148 244/215 |
| 6,499,952 B1 * | 12/2002 | Jacot | F03G 7/065 416/155 |
| 6,769,873 B2 | 8/2004 | Beauchamp et al. | |
| 6,834,835 B1 * | 12/2004 | Knowles | B64C 3/54 244/198 |
| 7,037,076 B2 * | 5/2006 | Jacot | F03G 7/065 416/155 |
| 7,101,237 B1 * | 9/2006 | Dai | B63B 9/001 416/23 |
| 7,632,068 B2 | 12/2009 | Bak et al. | |
| 8,038,396 B2 | 10/2011 | Anjuri et al. | |
| 8,366,057 B2 | 2/2013 | Vos et al. | |
| 8,473,122 B2 | 6/2013 | Simon | |
| 8,491,262 B2 | 7/2013 | McGrath et al. | |
| 8,499,913 B2 * | 8/2013 | Gunter | F03G 7/065 192/12 B |
| 8,517,682 B2 * | 8/2013 | Hancock | F03D 1/0641 416/23 |
| 8,616,846 B2 | 12/2013 | Nanukuttan et al. | |
| 8,657,561 B2 * | 2/2014 | Buffone | B64C 3/48 415/12 |
| 8,726,652 B1 * | 5/2014 | Gunter | F03G 7/065 244/87 |
| 8,827,644 B2 | 9/2014 | Behrens et al. | |
| 8,876,046 B2 * | 11/2014 | Gunter | F03G 7/065 244/99.8 |
| 9,487,291 B2 * | 11/2016 | Zientek | B64C 27/605 |
| 10,029,781 B2 * | 7/2018 | Bigbee-Hansen | B64C 11/30 |
| 2002/0131859 A1 * | 9/2002 | Alacqua | F04D 29/368 415/12 |
| 2003/0123973 A1 * | 7/2003 | Murakami | F03D 1/0675 415/4.1 |
| 2004/0067134 A1 * | 4/2004 | Beauchamp | F03D 7/022 416/37 |
| 2008/0292461 A1 * | 11/2008 | Stiesdal | F03D 7/0232 416/147 |
| 2009/0162199 A1 * | 6/2009 | Bernhard | B64C 27/615 416/23 |
| 2009/0175726 A1 * | 7/2009 | Rosati | F04D 29/368 416/147 |
| 2009/0212158 A1 * | 8/2009 | Mabe | B64C 9/32 244/1 N |
| 2009/0269198 A1 * | 10/2009 | Grohmann | B64C 27/615 416/23 |
| 2010/0310374 A1 * | 12/2010 | Dehlsen | F03D 1/0675 416/87 |
| 2011/0084174 A1 * | 4/2011 | Hemmelgarn | B64C 3/48 244/200 |
| 2011/0131971 A1 * | 6/2011 | Walls-Bruck | F03G 7/065 60/527 |
| 2011/0236212 A1 * | 9/2011 | Gallet | B64C 11/385 416/147 |
| 2011/0255974 A1 * | 10/2011 | Nanukuttan | F03D 1/065 416/146 R |
| 2012/0003090 A1 * | 1/2012 | Smith | F03D 7/06 416/91 |
| 2012/0068469 A1 * | 3/2012 | Behrens | F03D 1/0641 290/55 |
| 2012/0070284 A1 | 3/2012 | Westergaard et al. | |
| 2012/0134803 A1 * | 5/2012 | McGrath | F03D 7/0252 416/1 |
| 2012/0134812 A1 * | 5/2012 | Nanukuttan | F03D 1/0633 416/1 |
| 2012/0134814 A1 * | 5/2012 | McGrath | F03D 7/0252 416/23 |
| 2012/0139259 A1 * | 6/2012 | Glezer | F03G 6/04 290/55 |
| 2012/0219417 A1 * | 8/2012 | Podgurski | B64C 27/00 416/1 |
| 2013/0022463 A1 * | 1/2013 | Zuteck | F03D 7/022 416/1 |
| 2013/0064666 A1 * | 3/2013 | Thomas | B64C 3/52 416/158 |
| 2013/0259681 A1 * | 10/2013 | Perlman | B64C 27/72 416/1 |
| 2014/0154074 A1 * | 6/2014 | Zientek | B64C 27/605 416/1 |
| 2014/0271192 A1 * | 9/2014 | Brooks | F03D 7/022 416/23 |
| 2014/0271212 A1 * | 9/2014 | Brooks | F03D 7/0252 416/223 R |
| 2016/0083824 A1 * | 3/2016 | Brown | F03G 7/065 244/133 |
| 2017/0320562 A1 * | 11/2017 | Bogrash | B64C 11/18 |
| 2017/0356478 A1 * | 12/2017 | Guest | F15D 1/12 |

FOREIGN PATENT DOCUMENTS

| | | |
|---|---|---|
| EP | 2974954 A1 | 1/2016 |
| WO | 2010151230 A1 | 12/2010 |

OTHER PUBLICATIONS

Herrig, et al., "Aero-Elastically Tailored Wind Blade Tip Joint", PCT Patent Application Serial No. WO/US2016/046608, filed Aug. 11, 2016.

Buravalla, et al., "System for Wind Turbine Blade Actuation", PCT Patent Application Serial No. WO/US15/25839, filed Apr. 15, 2014.

* cited by examiner

SYSTEM FOR WIND TURBINE BLADE ACTUATION

BACKGROUND

The invention generally relates to wind turbines and, more particularly, to a system for actuating wind turbine blades in the wind turbine.

Conventional wind turbine blades are controlled using various methods to enhance the structural and aerodynamic performance of the wind turbine blades. One such method may include pitch control of complete wind turbine blade to reduce structural loads and aerodynamic loads at a root of the wind turbine blade. However, the aforementioned method is limited to performing pitch control for the complete wind turbine blade and is unable to perform one or more functions associated with reducing the structural loads and the aerodynamic loads of the wind turbine blade such as local morphing of the shape of the wind turbine blade, flapping of trailing edge, and activating synthetic jets. The one or more functions help in reducing the structural loads and the aerodynamic loads in the wind turbine blade, which increases the efficiency of the wind turbine. However, conventional actuation mechanisms such as electrical drives, hydraulic, and pneumatic drives may not be feasible to perform the one or more functions of the wind turbine blades as the conventional actuation mechanisms are generally heavy and require additional power supply accessories which may create undesirable complexities and mass/weight penalties on the wind turbine.

Previous system and method for actuating wind turbine blades have included actuation mechanisms utilizing shape memory alloys (SMAs). Due to their high power density, reliability/availability (lack of moving parts, corrosion resistance, electrical activation, etc.), shape memory alloys (SMAs) are nearly ideal actuators for such control tasks. Such use of an SMA actuator mechanism is discussed in commonly assigned, pending PCT Application Ser. No. PCT/US15/25839, Buravalla, V. et al., "SYSTEM FOR WIND TURBINE BLADE ACTUATION". Said application includes the use of an SMA torque tube to change the tip incidence between two states, when having different torsion angles below and above the shape change temperature. In many instances, costs of such an SMA tubes and the time to thermally activate it would be very high.

Accordingly, there is a need for an improved system and method for actuating the wind turbine blades.

BRIEF DESCRIPTION

These and other shortcomings of the prior art are addressed by the present disclosure, which includes a wind turbine blade with improved actuation.

Briefly, one aspect of the present disclosure resides in a wind turbine blade. The wind turbine blade includes a first blade segment and a second blade segment, a coupling component and a thermal actuation component. The first blade segment and the second blade segment extending in opposite directions from a chord-wise joint. Each of the blade segments having a pressure side shell member, a suction side shell member. The coupling component extending spanwise and structurally connecting the first blade segment and the second blade segment. The thermal actuation component, coupled to the coupling component. The thermal actuation component actuated in response to a change in thermal conditions so as to provide for aeroelastic tailoring and pitch control to the wind turbine blade.

Another aspect of the disclosure resides in a wind turbine blade. The wind turbine blade includes a first blade segment and a second blade segment, joint rod and a thermal actuation component. The first blade segment and the second blade segment extending in opposite directions from a chord-wise joint. Each of the blade segments having a pressure side shell member, a suction side shell member. The joint rod extending spanwise and structurally connecting the first blade segment and the second blade segment. The thermal actuation component coupled to the joint rod. The thermal actuation component comprises at least one shape memory alloy (SMA) actuator actuated in response to a change in thermal conditions so as to provide for aeroelastic tailoring and pitch control to the wind turbine blade.

Yet another aspect of the disclosure resides in a wind turbine blade. The wind turbine blade includes a first blade segment and a second blade segment, a coupling component and a thermal actuation component. The first blade segment and the second blade segment extending in opposite directions from a chord-wise joint. Each of the blade segments having a pressure side shell member, a suction side shell member. The coupling component extending spanwise and structurally connecting the first blade segment and the second blade segment. The thermal actuation component coupled to the coupling component. The thermal actuation component comprises one of: (i) a cartridge disposed about the coupling component; (ii) a plurality of spanwise spaced apart bearings disposed about the coupling component in conjunction with plurality of torque arms coupled to the coupling component, a plurality of attachment blocks coupled to the coupling component and a plurality of SMA actuators; (iii) a bearing disposed about the coupling component, a holding block spaced spanwise a distance from the bearing and fixedly attached to the coupling component and at least one SMA actuator; (iv) a ball-screw bearing coupled to the coupling component; or (v) a bearing component coupled to the coupling component and supporting the coupling component. The cartridge including a plurality of spanwise spaced apart bearings and a plurality of SMA actuators comprising at least one of an SMA coil spring and an SMA wire, disposed in a tangential arrangement, therebetween a periphery of the coupling component and the cartridge to provide for aeroelastic tailoring and pitch control to the wind turbine blade. The plurality of SMA actuators comprise at least one of an SMA coil spring and an SMA wire coupled to one of the plurality attachment blocks at a first end and to one of the of plurality of torque arms at a second end to provide for aeroelastic tailoring and pitch control to the wind turbine blade. The at least one SMA actuator comprising at least one SMA wire, spirally wound about the coupling component between the bearing and the holding block to provide for aeroelastic tailoring and pitch control to the wind turbine blade. The ball-screw bearing comprising a ball-screw bearing ring including a plurality of ball bearings in cooperative arrangement with one of a threaded shaft disposed about and coupled to the coupling component and defining a helical raceway for the ball bearings of the ball-screw bearing ring or a helical raceway formed into an exterior surface of the coupling component for the ball bearings of the ball-screw bearing ring. The ball-screw bearing defining a mechanical linear actuator that translates linear motion of the ball-screw bearing ring to rotational motion of the coupling component to provide for aeroelastic tailoring and pitch control to the wind turbine blade. The bearing component disposed in cooperative arrangement with a spiral raceway formed into an exterior surface of the coupling component and a slot formed in the cartridge to define a mechanical linear actuator that translates linear motion of the bearing component to rotational motion of the coupling component.

Various refinements of the features noted above exist in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein: in accordance with one or more embodiments shown or described herein.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Embodiments of the present invention include an actuation system for providing passive aeroelastic tailoring and secondary pitch control in wind turbine blades. In at least some embodiments, the inventive apparatus may advantageously enable actuation of a section of the wind turbine blade. The actuation system includes a passive actuator element formed of a shape memory alloy. Such an actuation system is light in weight and can be disposed in any section of the wind turbine blade.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Approximating language may be applied to modify any quantitative representation that could permissibly vary without resulting in a change in the basic function to which it is related. Accordingly, a value modified by a term or terms, such as "about," "approximately," and "substantially," is not to be limited to the precise value specified. In at least some instances, the approximating language may correspond to the precision of an instrument for measuring the value. Here and throughout the specification and claims, range limitations are identified. Such ranges may be combined and/or interchanged, and include all the sub-ranges contained therein unless context or language indicates otherwise. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item. As used herein, singular forms such as "a," "an," and "the" include plural referents unless the context clearly dictates otherwise.

Figure 1:
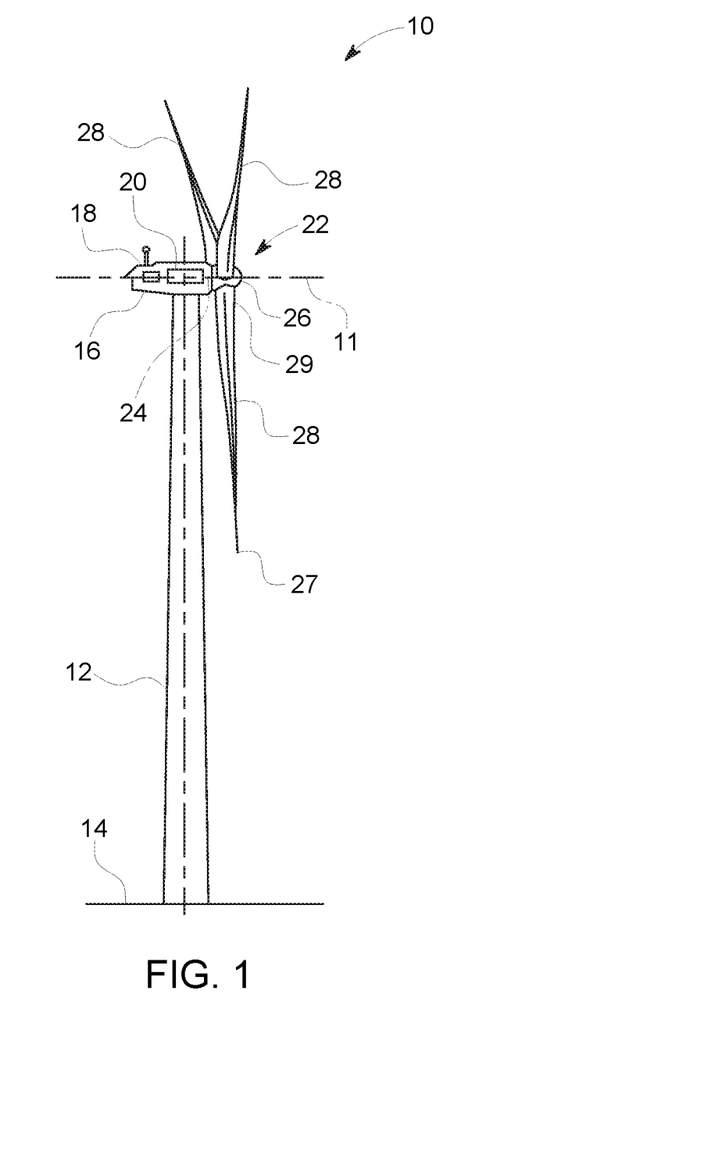
FIG. 1 is a side view of an exemplary wind turbine in accordance with an example of the present technology.

FIG. 1 is a side view of an exemplary wind turbine 10 in accordance with an embodiment of the present invention. In this embodiment, the wind turbine 10 is a horizontal-axis wind turbine, as indicated by horizontal axis 11. Alternatively, the wind turbine 10 may be a vertical-axis wind turbine. In the present embodiment, the wind turbine 10 includes a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. The rotor 22 includes a rotatable hub 26 and at least one rotor blade 28 coupled to and extending outward from the rotatable hub 26. As shown, the rotor blade 28 extends from a blade tip 27 to a blade root 29.

Figure 2:
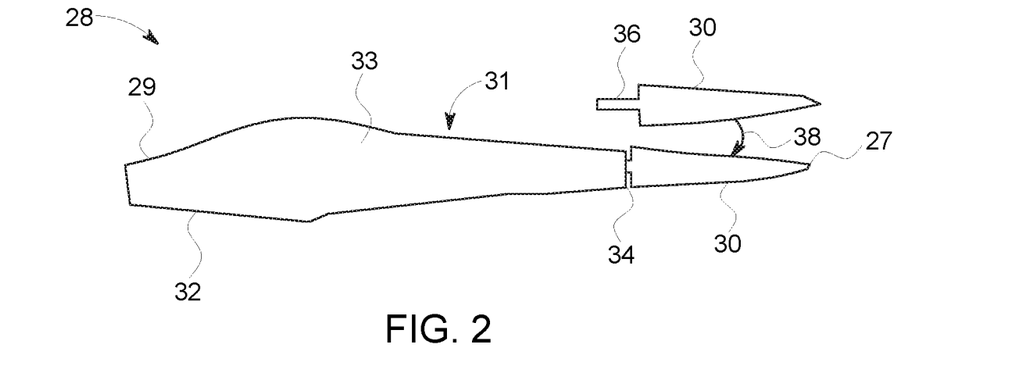
FIG. 2 is a plan view of a rotor blade having a first blade segment and a second blade segment, in accordance with one or more embodiments shown or described herein.

FIG. 2 is a plan view of a rotor blade 28 having a first blade segment 30 and a second blade segment 32 in accordance with an example of the present technology. The first blade segment 30 and the second blade segment 32 extend in opposite directions from a chord-wise joint 34. Each of the blade segments 30, 32 includes a pressure side shell member 31 and a suction side shell member 33. The first blade segment 30 and the second blade segment 32 are connected by at least one internal support structure 36 extending into both blade segments 30, 32 to facilitate joining of the blade segments 30, 32. The arrow 38 shows that the segmented rotor blade 28 in the illustrated example includes two blade segments 30, 32 and that these blade segments 30, 32 are joined by inserting the internal support structure 36 into the second blade segment 32.

Figure 3:
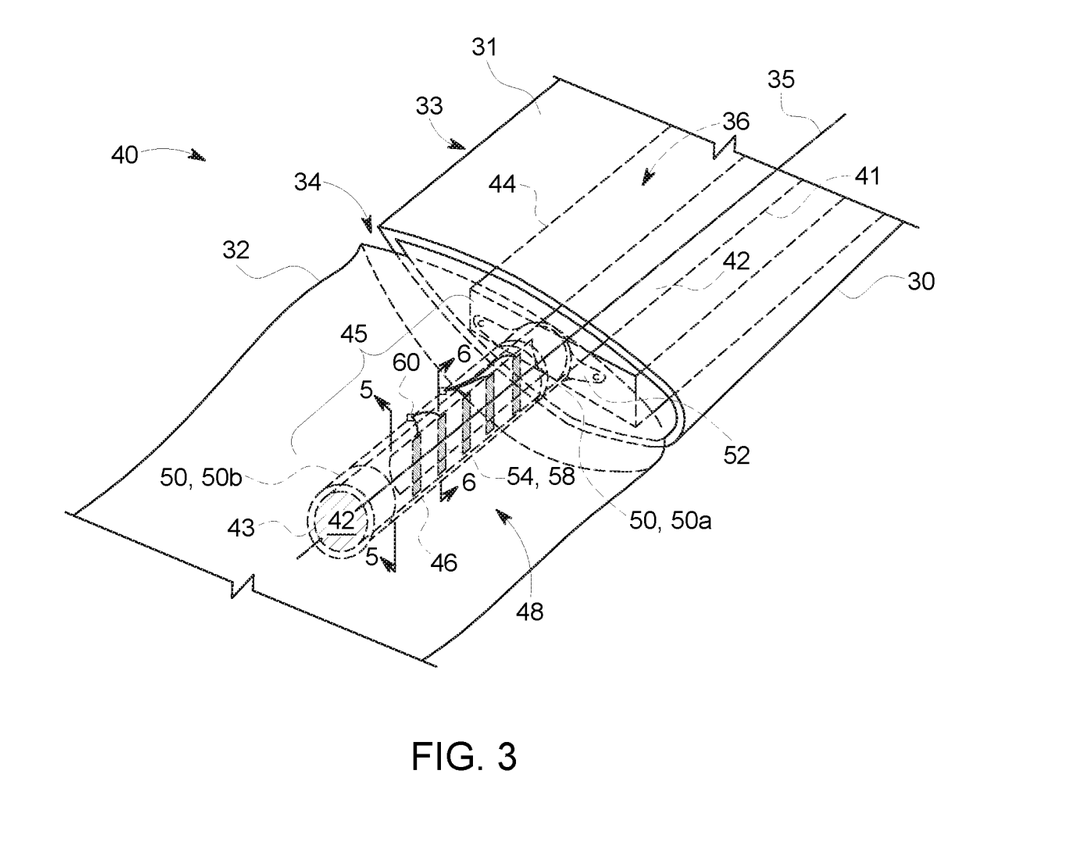
FIG. 3 is a schematic representation of a section of the first blade segment and the second blade segment of a wind turbine blade including an actuation system, in accordance with one or more embodiments shown or described herein.
Figure 4:
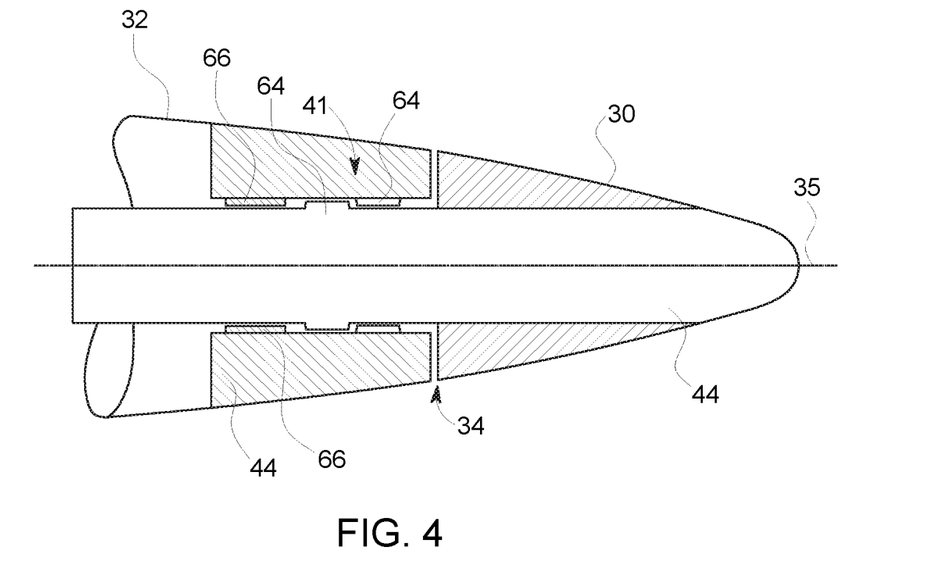
FIG. 4 is a schematic representation of a portion of another embodiment of coupling component of the actuation system, in accordance with one or more embodiments shown or described herein.
Figure 5:
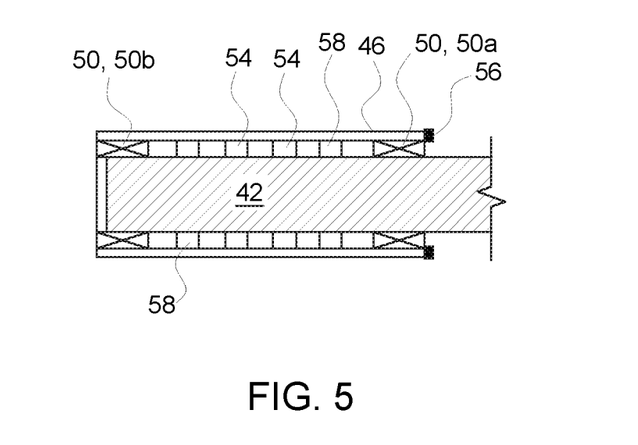
FIG. 5 is a schematic cross-sectional view of the actuation system taken through line 5-5 of FIG. 3, in accordance with one or more embodiments shown or described herein.
Figure 6:
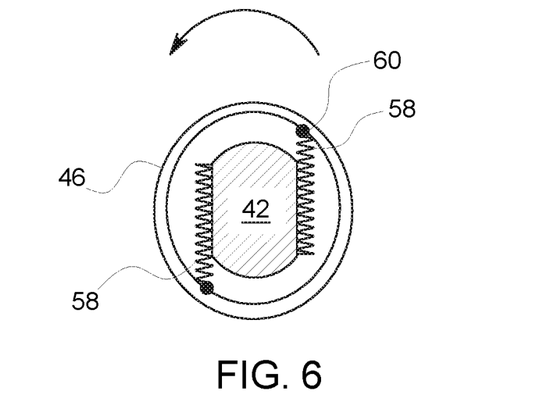
FIG. 6 is a schematic cross-sectional view of the actuation system taken through line 6-6 of FIG. 3, in accordance with one or more embodiments shown or described herein.

Turning now to FIGS. 3-8, shown therein is a perspective view of a first embodiment of a system for wind turbine actuation 40, illustrating a section of the first blade segment 30 and the second blade segment 32 (prior to complete assembly) in accordance with an example of the present technology. FIGS. 5 and 6 illustrate cross-sectional views of a portion of the system of FIG. 3 in further detail. As best illustrated in FIG. 3, the first blade segment 30 includes a coupling component 41 extending spanwise and structurally connecting the first blade segment 30 and the second blade segment 32. The coupling component 41 allows a rotational degree of freedom around essentially a pitch axis 35 while restraining motions in the flap/out-of-plane and edge/in-plane direction to an acceptable minimum. In the illustrated embodiment of FIG. 3, the coupling component 41 is a rod or beam structure, and more particularly a joint rod 42 that forms a portion of the internal support structure 36 and extends lengthways for structurally connecting with the second blade segment 32. The joint rod 42 forms a part of the first blade segment 30 extending from a spar section 44. In an embodiment, the joint rod is formed as a composite beam or alternatively, as a metal tube.

In an alternate embodiment, as best illustrated in FIG. 4, the coupling component 41 may be configured as an extension of, and integrated with, the spar section 44 of each of the first blade segment 30 and the second blade segment 32, thereby allowing a rotational degree of freedom around the pitch axis 35 while restraining motions in the flap/out-of-plane and edge/in-plane direction to an acceptable minimum. In such an embodiment, the spar sections 44 may include splines, gears, washers, rollers, and/or teeth-like interfaces, generally referenced 64, in a chord-wise plane which mesh at the chord-wise joint 34 to form the coupling between the first blade segment 30 and the second blade segment 32. In addition, one or more bearing supports 66 further providing for the resistance of bending and twisting loads and provide desired relative motion upon torque actuation (as described herein). In yet another alternate embodiment, the coupling component 41 may include a double-T like beam having high torsional flexibility. It should be understood herein, that while reference throughout the embodiments is made to the inclusion of a joint rod, the extension of the spar 44 as described in FIG. 4 may be incorporated in lieu of the described joint rod in each embodiment, and to which the actuation component (described herein) is coupled thereto in a similar manner.

Referring again to FIG. 3, as well as FIGS. 5 and 6, the joint rod 42 is disposed within, and more particularly, having formed thereabout, the pressure side shell member 31 and the suction side shell member 33 of the first blade segment 30. In a non-limiting example, the joint rod 46 is configured as tubular-like structure. As shown, the joint rod 46 is oriented in a span-wise direction. In an embodiment, the first blade segment 30 may include additional locking mechanisms, such as a locking pin slot (not shown) located on the joint rod 46 proximate to the chord-wise joint 34 so as to lock against spanwise liberation and/or torsion blocking mechanisms, such as a brake/clamping system (not shown), so as to reduce power demand in an actuated state. In other non-limiting examples, there may be alternate means for maintaining attachment of the first blade segment 30 and the second blade segment 32.

The system for wind turbine actuation 40 further comprises a thermal actuation component 45 that allows actuating the blade tip in response to a change in thermal conditions so as to rotate the beam 42. Additionally, due to its finite torsional stiffness, the actuation component 45 may provide for both aeroelastic tailoring (pitch response to changes in aero and/or inertial loads) and pitch control of a turbine blade. In this particular embodiment, the thermal actuation component 45 comprises a cartridge 46 disposed towards a first end 48 of the joint rod 42. The cartridge 46 is generally configured as a tube-like structure and includes a plurality of bearings 50, and more particularly a first bearing 50a adjacent a flange 52 for mounting to the first blade segment 30, such as to the spar section 44, and providing support to the first blade segment 30. The plurality of bearings 50 further include a second bearing 50b to support one or more SMA actuators 54. The cartridge 46 is configured to provide for disposing of the joint rod 42 therein. The plurality of bearings 50 provide for pitch rotation of the cartridge 46 and thus the first blade segment 30 relative to the second blade segment 32. In an embodiment, one or more geometric elements, such as notches 56 may be included to provide for axial alignment of the cartridge 46.

As previously indicated, emergency situations in which extreme loads occur are very infrequent. This infrequency of occurrence opens up possibilities to run the turbine 10 in a state that is too risky for the extreme situation and only put it into a safe configuration when the situation demands. This can be enabled by having an additional degree of freedom for blade loads control during extreme events. As disclosed herein, the use of shape memory alloys (SMAs) as the actuators 54 provides for control of such tasks.

As best illustrated in FIG. 6, in this particular embodiment the one or more SMA actuators 54, are disposed in a tangential/secant arrangement, therebetween a periphery 43 of the joint rod 42 and the cartridge 46 to provide pitch control aeroelastically and when actuated. Due to their high power density, reliability (e.g., lack of moving parts, corrosion resistance, electrical activation) and availability, SMAs are disclosed herein for such control tasks. SMAs are based on a change of mechanical properties of a material during the reversible transformation of two allotropic phases (e.g. martensite phase to austenite phase in a NiTi alloy). SMAs provide for restoration of an original shape of deformed material or transition to a different shape and stiffness by heat. The SMA actuators 54 enable pitching of the first blade segment 30 via the joint rod 42, in addition to providing twist changes.

Figure 7:
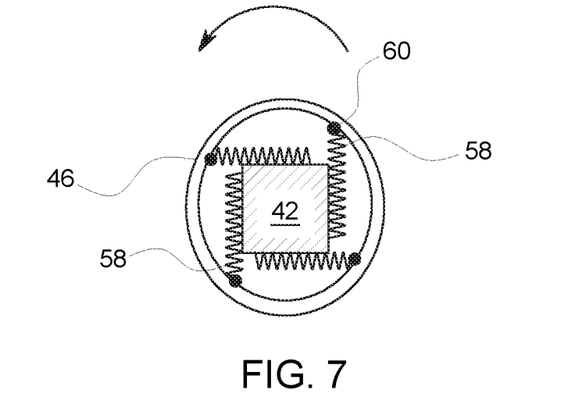
FIG. 7 is a schematic cross-sectional view of an alternate embodiment of a portion of the SMA actuator of FIG. 3, in accordance with one or more embodiments shown or described herein.
Figure 8:
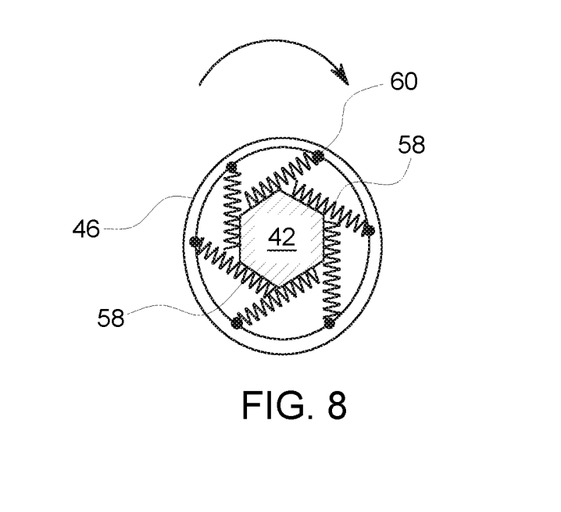
FIG. 8 is a schematic cross-sectional view of an alternate embodiment of a portion of the SMA actuator of FIG. 3, in accordance with one or more embodiments shown or described herein.

In this particular embodiment, the cartridge 46 has disposed therebetween the periphery 43 of the joint rod 42 and the cartridge 46 one or more SMA wire band actuators 58, as the SMA actuators 54, to provide pitch control by the SMA temperature. The SMA actuators 54 are coupled to the cartridge 46 at a first end and to the joint rod 42 at an opposed second end. Alternate configurations illustrating coupling of the SMA actuators 54 to the joint rod 42 and cartridge 46 are illustrated in FIGS. 7 and 8, with like characters representing like parts throughout the drawings. In configuring the SMA actuators 54 in such a manner there can be pairs located on both sides of the joint rod 42, thus multiplying the torque by 2. In addition, antagonistic pairs of SMA actuators 54 acting in opposite direction provides for the blade to pitch in two directions. In an alternate embodiment, the one or more SMA actuators 54 may comprise a plurality of preloaded SMA coil springs (described presently).

To provide heating to the one or more SMA actuators 54, one or more electrical supply connectors 60 are configured in cooperation with each of the one or more SMA actuators 54. In an embodiment, the SMA actuators 54, and more particularly either the SMA wire band actuators 58 or the SMA coil springs, are configured under tension to avoid buckling under compression and have a mean pitching moment, as indicated by arrow 62. During actuation, the SMA wire band actuators 58 translate a change in length into a rotary motion, which accordingly turns the joint rod 42 to a different angle. Upon cooling, the SMA wire band actuators 58 return to the original length, which moves the joint rod 42 back to the original position. In an embodiment employing a plurality of SMA coil springs, during actuation the SMA coil springs translate a change in length to a circumferential motion of the attachment point on the joint rod 42, which accordingly turns the joint rod 42 to a different angle. Upon cooling, the SMA coil springs return to the original stiffness and length, which in combination with the pre-load by the return spring(s) moves the joint rod 42 back to the original position. Having two coil springs act against each other may provide for return motion, requiring coordinated temperature control to avoid overload.

During actuation, approximately 2% strain at a stress of several hundred MPa may be achieved to minimize any reduction in the life of the SMA actuators 54. The system must be laid out in terms of moment arm and SMA actuator cross sectional area such that a ~2% length change translates into the desired rotational twist motion (e.g., 2°-4°). In an embodiment the tensile actuator arrangement will likely have a higher stiffness, with the cross sectional area of the SMA actuators 54 mainly being controlled by the peak moment that must be sustained statically and the required actuation moment.

Figure 9:
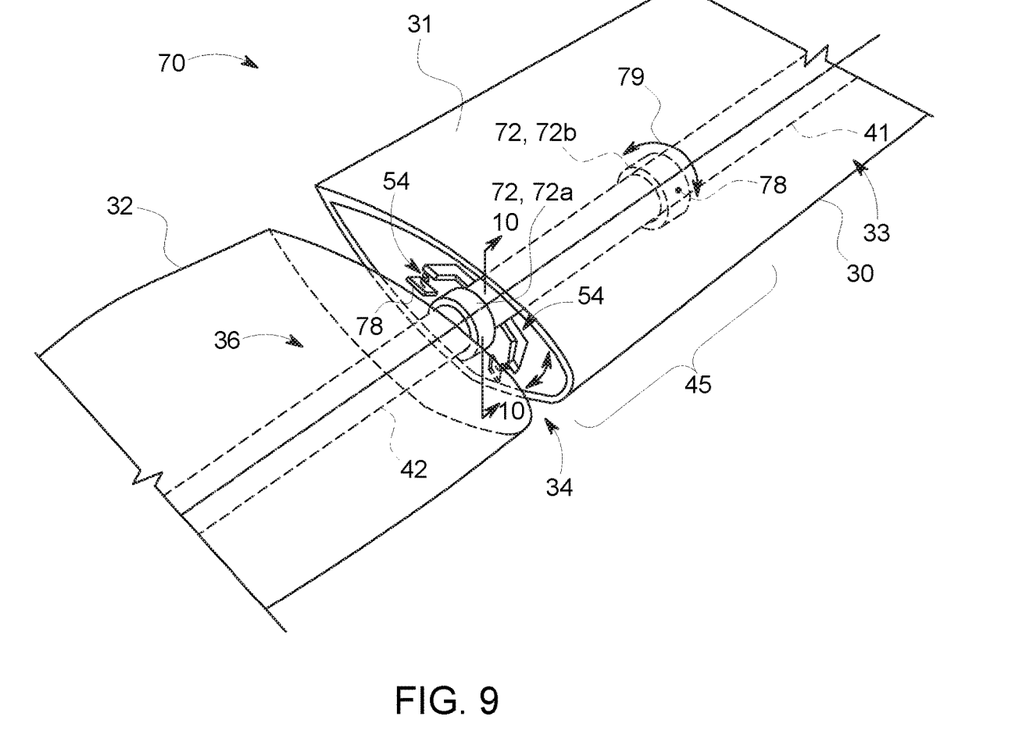
FIG. 9 is a schematic representation of a section of the first blade segment and the second blade segment of a wind turbine blade including another embodiment of an actuation system, in accordance with one or more embodiments shown or described herein.
Figure 10:
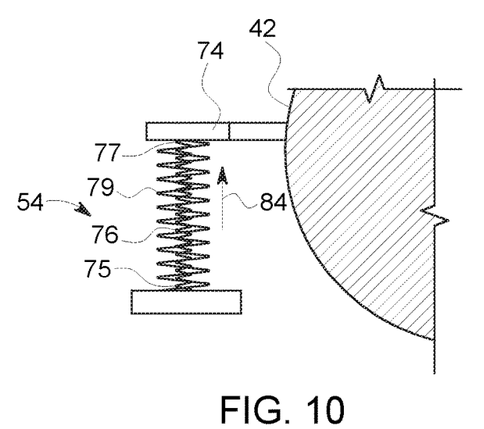
FIG. 10 is a schematic partial cross-sectional view of a portion of the actuation system taken through line 10-10 of FIG. 9, in accordance with one or more embodiments shown or described herein.

Turning to FIG. 9, shown therein is a perspective view of a second preferred embodiment of a system for wind turbine actuation 70, again illustrating a section of the first blade segment 30 and the second blade segment 32 (prior to complete assembly) in accordance with an example of the present technology. FIG. 10 is a cross-sectional view illustrating a portion of the system of FIG. 9 in further detail. It is noted that unless otherwise indicated, the second preferred embodiment of the system for wind turbine actuation includes the same components identified during the description of the first preferred embodiment. The first blade segment 30 includes a coupling component 41, such as a rod, beam or spar extension. In this particular embodiment, the coupling component 41 is a joint rod 42 that forms a portion of the internal support structure 36 and extends lengthways for structurally connecting with the second blade segment 32. The joint rod 42 forms a part of the first blade segment 30 extending from a spar section (not shown). The joint rod 42 is disposed within, and more particularly, having formed thereabout, the pressure side shell member 31 and the suction side shell member 33 of the first blade segment 30. In a non-limiting example, the joint rod 42 is configured as a tubular-like structure. As shown, the joint rod 42 is oriented in a span-wise direction. Similar to the previous embodiment, the first blade segment 30 may include additional locking mechanisms, such as a locking pin slot (not shown) located on the joint rod 42 proximate to the chord-wise joint 34. In other non-limiting examples, there may be alternate means for maintaining attachment of the first blade segment 30 and the second blade segment 32. In an embodiment, the coupling component 41 is configured as an extension of the blade spar (similar to FIG. 4) or as a component that is inserted into a respective pocket (not shown) in the second blade segment 32, with the first blade segment 30 and bearings 72 coupled to it, such that the coupling component 41 is allowed to rotate and be secured against liberation in an axial direction by exerted centrifugal forces.

The system for wind turbine actuation 70 further comprises a thermal actuation component 45 that is passively actuated in response to a change in thermal conditions so as to provide for aeroelastic tailoring and pitch control to a turbine blade. In this particular embodiment, the thermal actuation component 45 comprises a plurality of spaced apart bearings 72 disposed on the joint rod 42, and more particularly, disposed within the first blade segment 30. The plurality of spaced apart bearings 72 may include a first bearing 72a and a second bearing 72b to support the joint rod 42. The plurality of spaced apart bearings 72 are configured to provide for disposing of the joint rod 42 therein, while providing rotation of the joint rod 42. The thermal actuation component 45 further comprises a plurality of torque, or lever, arms 74, a plurality of SMA actuators 54 and a plurality of attachment blocks 78 coupled thereto the blade segment 30. As best illustrated in detail in FIG. 9, in this particular embodiment, each of the plurality of SMA actuators 54 is generally comprised of an SMA coil spring 76. In the illustrated embodiment, the SMA spring 76 is coupled at a first end 75 to one of the attachment blocks 78 and at a second end 77 to one of the torque, or lever, arms 74. During actuation, the SMA coil spring 76 in response to temperature changes, lengthens or shortens, thereby moving the torque, or lever, arm 74 and allowing for rotation of the joint rod 42, as indicated by arrow 79 for control of the pitch action. In an embodiment, the SMA actuators 54 may be configured to double the torque by having each of the SMA actuators 54 pull in the same direction, with a return actuation provided by a return-spring actuator 79 acting against the SMA actuators 54 and thereby providing the preload. In an alternate embodiment, the SMA actuators 54 comprise a pre-loaded spring so as to enable movement of the torque, or lever, arm 74 and create torsion when contracting/expanding. With proper tailoring of the pitch axis location and aerodynamic and inertial load characteristics of the pitching tip a passive pitch control of the turbine blade can be designed.

The plurality of bearings 72 provide for pitch rotation of the joint rod 42 and thus the first blade segment 30 relative to the second blade segment 32. In an embodiment, one or more elements, such as a connection bolt 78 may be included to provide for radial alignment of the joint rod 42.

As previously disclosed, the use of SMAs provides for control of blade loads during extreme events. The SMA actuators 54 provide for control of such tasks. As previously indicated, shape memory alloys (SMAs) are utilized in the SMA actuator 54 due to their high power density, reliability and availability. As illustrated in this particular embodiment, the one or more SMA actuators 54, are coupled to the joint rod 42 to provide pitch control aeroelastically and when actuated. As previously indicated, in an embodiment, the system 70 may include the return-spring actuator 79, which can decrease the pitch resetting times after actuation. The SMA actuators 54 enable pitching of the first blade segment 30.

Figure 11:
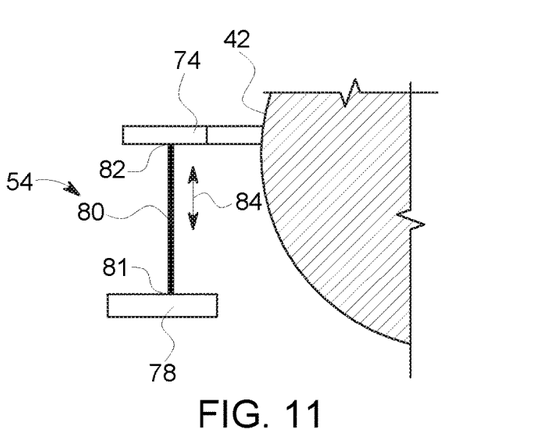
FIG. 11 is a schematic cross-sectional view of an alternate embodiment of a portion of the SMA actuator of FIG. 9, in accordance with one or more embodiments shown or described herein.

As previously described, in this particular embodiment, the SMA actuator 54 has included a plurality of SMA coil springs 76, to provide pitch control by the SMA temperature. In an alternate embodiment, as best illustrated in FIG. 11, the SMA actuator 54 may comprise a plurality of SMA wires 80. Similar to the SMA coils springs 76, each of the plurality of wires 80 is coupled at a first end 81 to the attachment block 78 and at a second end 82 to the torque arm 74. To provide heating to the plurality of SMA coil springs 76 (FIG. 10) or the plurality of SMA wires 80 (FIG. 11), one or more electrical supply connectors (not shown) may be configured in cooperation with each of the one or more SMA actuators 54. In an embodiment, the SMA actuators 54, and more particularly the plurality of SMA coil springs 76 and/or the plurality of SMA wires 80, are configured under tension and undergo a change in length, as indicated by arrows 84 when under the influence of heating/cooling, such as. Similar to the previously described embodiment of FIGS. 3-5, the length change of the SMA actuators 54 translates into a rotary motion of the joint rod 42.

Figure 12:
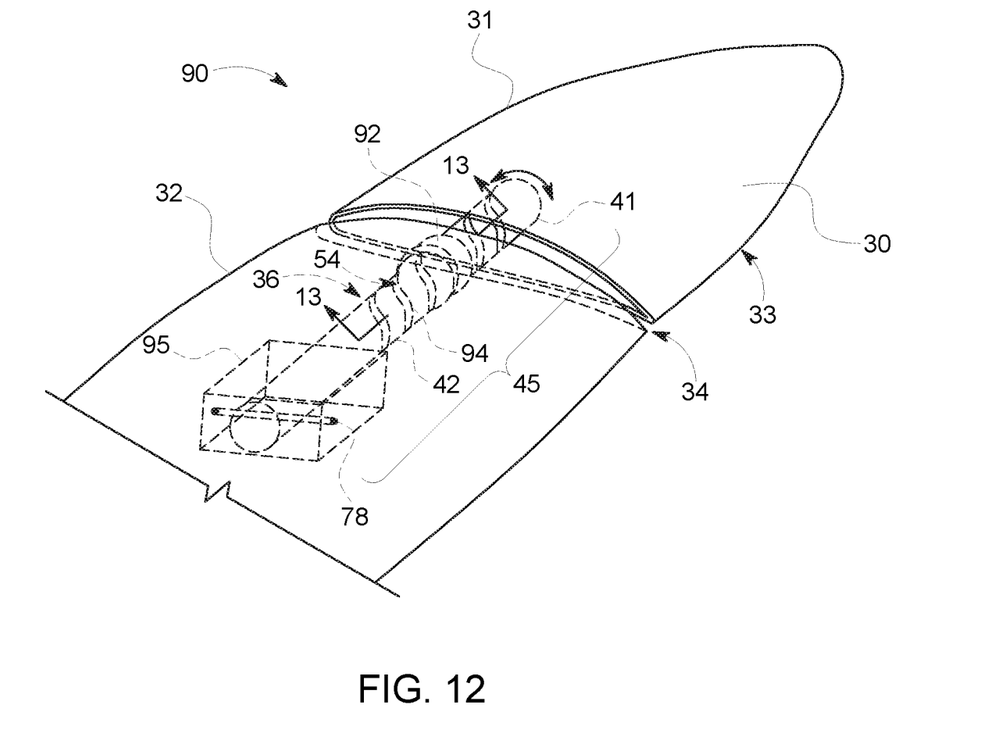
FIG. 12 is a schematic representation of a section of the first blade segment and the second blade segment of a wind turbine blade including another embodiment of an actuation system, in accordance with one or more embodiments shown or described herein.
Figure 13:
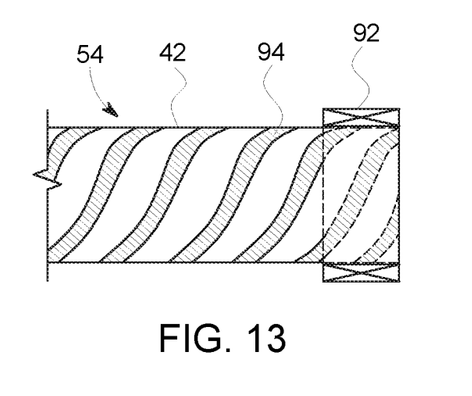
FIG. 13 is a schematic partial cross-sectional view of a portion of the actuation system taken through line 13-13 of FIG. 12, in accordance with one or more embodiments shown or described herein.

Turning to FIG. 12, shown therein is a perspective view of a third preferred embodiment of a system for wind turbine actuation 90, again illustrating a section of the first blade segment 30 and the second blade segment 32 (prior to complete assembly) in accordance with an example of the present technology. FIG. 13 is a cross-sectional view illustrating a portion of the system of FIG. 12 in further detail. It is noted that unless otherwise indicated, the third preferred embodiment of the system for wind turbine actuation includes the same components identified during the description of the first and second preferred embodiments. The first blade segment 30 includes a coupling component 41, such as a rod, beam or spar extension. In this particular embodiment, the coupling component 41 is a joint rod 42 that forms a portion of the internal support structure 36 and extends lengthways for structurally connecting with the second blade segment 32. In this particular embodiment, the joint rod 42 is comprised of a composite material to allow for twisting of the joint rod 42 as presently described. The joint rod 42 forms a part of the first blade segment 30 extending from a spar section (not shown). The joint rod 42 is disposed within, and more particularly, having formed thereabout, the pressure side shell member 31 and the suction side shell member 33 of the first blade segment 30. Similar to the previous embodiment, in a non-limiting example, the joint rod 42 is configured as a tubular-like structure. As shown, the joint rod 42 is oriented in a span-wise direction. As previously described, to maintain attachment of the first blade segment 30 to the second blade segment 32, one of the segments 30, 32 may include locking mechanisms, such as a locking pin slot (not shown) located on the joint rod 42 proximate to the chord-wise joint 34. In an embodiment, the coupling component 41 is configured as an extension of the blade spar (similar to FIG. 4) or as a component that is inserted into a respective pocket (not shown) in the second blade segment 32, with the first blade segment 30 and bearings 92 coupled to it, such that the coupling component 41 is allowed to rotate and be secured against liberation in an axial direction by exerted centrifugal forces. In other non-limiting examples, there may be alternate means for maintaining attachment of the first blade segment 30 and the second blade segment 32.

The system for wind turbine actuation 90 further comprises a thermal actuation component 45 that is passively actuated in response to a change in thermal conditions so as to provide for aeroelastic tailoring and pitch control to a turbine blade. In this particular embodiment, the thermal actuation component 45 comprises, a bearing 92 disposed about the joint rod 42, and more particularly, disposed within the second blade segment 32 and a holding block 95 spaced a spanwise distance from the bearing 92 and providing a fixed mounting for the joint rod 42. The bearing 92 and the holding block 95 support the joint rod 42. The bearing 92 is configured to provide for disposing of the joint rod 42 therein, while providing rotation of the joint rod 42. The thermal actuation component 45 further comprises an SMA actuator 54 coupled thereto the joint rod 42. As best illustrated in detail in FIG. 12, in this particular embodiment, the of SMA actuator 54 is generally comprised of at least one SMA spiral winding 94 wound about the composite joint rod 42. In an embodiment, the SMA spiral winding 94 comprises an SMA wire or band that is wound about the composite joint rod 42 so as to create a twisting force, causing the composite joint rod 42 to twist when the SMA spiral winding 94 is contracting/expanding and allowing for passive control of the pitch action of a turbine blade.

The SMA spiral winding 94 provides for pitch rotation of the joint rod 42 and thus the first blade segment 30 relative to the second blade segment 32. As best illustrated in FIG. 12, the joint rod 42 is fixedly coupled to the second blade segment 32 via the holding block 95 and one or more attachment elements, such as a connection bolt 78 to provide for radial and axial alignment of the joint rod 42.

As previously disclosed, the use of SMAs provides for control of blade loads during extreme events. As previously indicated, shape memory alloys (SMAs) are utilized in the SMA actuator 54 due to their high power density, reliability and availability. The SMA actuator 54 provides for control of such tasks. As illustrated in this particular embodiment, the SMA actuator 54, and more particularly the SMA spiral winding 94, is spirally wound about the joint rod 42 to provide pitch control aeroelastically and when actuated. The SMA actuator 54 enables pitching of the first blade segment 30 in addition to providing twist changes.

In the illustrated embodiment of FIGS. 12 and 13, the SMA actuator 54 has included a single spirally wound SMA wire 94, to provide pitch control by the SMA temperature. In an alternate embodiment, the SMA actuator 54 may comprise dual spirally wound parallel SMA wires 94 so as to require only one side to feed current through. More particularly, at least two SMA wires, such as SMA wires 94, or bands, can be wound in a parallel manner around the joint rod 42, allowing the current to be fed in at the e.g. inboard end into one band and returning it from an outboard end back to the inboard end through the other band.

Figure 14:
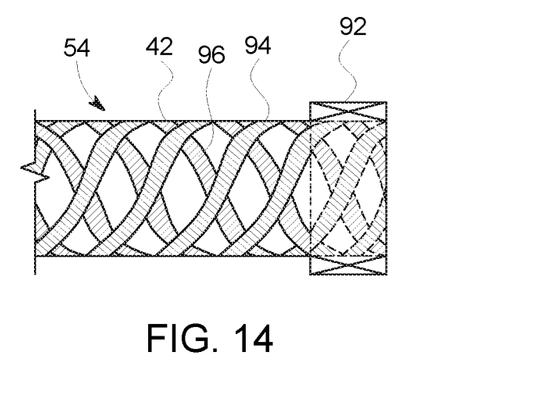
FIG. 14 is a schematic partial cross-sectional view of an alternate embodiment of a portion of the SMA actuator of FIG. 12, in accordance with one or more embodiments shown or described herein.

In yet another alternate embodiment, as best illustrated in FIG. 14, the SMA actuator 54 may comprise a first spirally wound SMA wire 94 wound in a first direction, and a second spirally wound SMA wire 96 wound in an opposed direction. To provide heating to the one or more SMA coil wire 94, one or more electrical supply connectors (not shown) may be configured in cooperation with the SMA actuator 54. During actuation, the SMA actuator 54 undergoes a change in length when under the influence of heating/cooling thereby exerting a twisting force on the joint rod 42. In this particular embodiment, only one of the first spirally wound SMA wire 94 or the second spirally wound SMA wire 96 is heated by the current, thereby twisting the first blade segment 30 relative to the second blade segment 32 in the respective direction as its stiffness increases abruptly and length changes. The heating of either the first spirally wound SMA wire 94 or the second spirally wound SMA wire 96 overrules the stiffness of the other of the first spirally wound SMA wire 94 or the second spirally wound SMA wire 96 and setting a new equilibrium position. In an embodiment, thermal insulation (not shown) or thermal lag may be required between the first spirally wound SMA wire 94 and the second spirally wound SMA wire 96.

Figure 15:
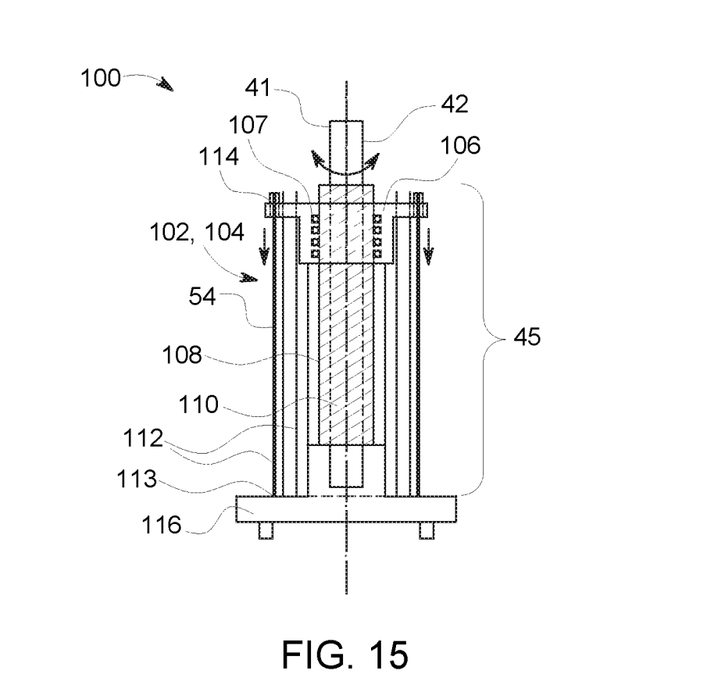
FIG. 15 is a schematic representation of another embodiment of an actuation system, in accordance with one or more embodiments shown or described herein.
Figure 16:
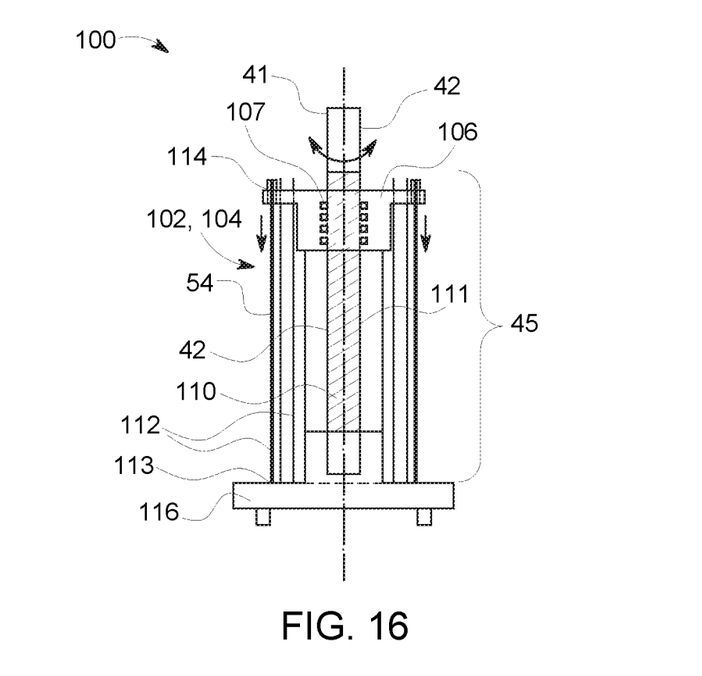
FIG. 16 is a schematic representation of another embodiment of an actuation system, in accordance with one or more embodiments shown or described herein.

Turning to FIGS. 15 and 16, shown therein are schematic cross sectional views of a fourth preferred embodiment of a system for wind turbine actuation 100 in accordance with an example of the present technology. It is noted that unless otherwise indicated, the fourth preferred embodiment of the system for wind turbine actuation includes the same components identified during the description of the previously described embodiments. More particularly, illustrated in the embodiment of FIGS. 15 and 16 is a portion of the system for wind turbine actuation intended for disposing in a plurality of blade segments, such as previously described first blade segment 30 and second blade segment 32 (FIG. 2). In the illustrated embodiment, a coupling component 41, and more particularly a joint rod 42 is illustrated, and extends lengthways from the first blade segment (not shown) for structurally connecting with the second blade segment (not shown). Similar to the previous embodiment, in a non-limiting example, the joint rod 42 is configured as a tubular-like structure and oriented in a span-wise direction.

The system for wind turbine actuation 100 further comprises a thermal actuation component 45 that is passively actuated in response to a change in thermal conditions so as to provide for pitch control to a turbine blade. In this particular embodiment, the thermal actuation component 45 comprises, a bearing 102 coupled to the joint rod 42 and supporting the joint rod 42. In this particular embodiment, the bearing 102 is configured as a ball-screw bearing 104. The ball-screw bearing 104 includes a ball-screw bearing ring 106 including a plurality of ball bearings 107 that in cooperative arrangement with a helical raceway 110 acts as a mechanical linear actuator that translates linear motion to rotational motion. In one embodiment, as best illustrated in FIG. 15, the ball-screw bearing 104 includes a threaded shaft 108 disposed about and coupled to the joint rod 42 and defining the helical raceway 110 for the ball bearings 107 of the ball-screw bearing ring 106. In another embodiment, as best illustrated in FIG. 16, the joint rod 42 may be configured to include the helical raceway 110 for the ball bearings 107 of the ball-screw bearing ring 106, such as being formed into an exterior surface 111 of the joint rod 42.

In the illustrated embodiments, the ball-screw bearing ring 106 is configured to provide for disposing of the joint rod 42 therein so as to translate linear motion of the ball-screw bearing ring 106 to rotational motion of the joint rod 42. To provide for the linear motion of the ball-screw bearing ring 106, one or more SMA actuators 54 are coupled thereto. In this particular embodiment, each of the one or more SMA actuators 54 is generally comprised of an SMA wire 112. In the illustrated embodiment, the wire 106 is coupled at a first end 113 to a plate 116, such as a mounting flange 52 (FIG. 3) or other stable component, and at a second end 114 to the ball-screw bearing ring 106. During actuation, the wire 106 in response to temperature change, lengthens or shortens, thereby causing the ball-screw bearing ring 106 to translate linearly, closer to or further from the plate 116, so as to result in rotational motion of the joint rod 42 and thereby allowing for control of the pitch action.

The resulting linear movement of the ball-screw bearing ring 106 provides for pitch rotation of the joint rod 42 and thus the first blade segment 30 relative to the second blade segment 32. As previously described with regard to FIG. 12, in an embodiment the joint rod 42 may be fixedly coupled to the second blade segment 32 via one or more attachment elements to provide for radial and axial alignment of the joint rod 42. The ball-screw bearing ring 106 provides for integration of radial and axial support with rotational actuation.

As previously disclosed, the use of SMAs provides for control of blade loads during extreme events. The SMA actuators 54 provide for control of such tasks. As illustrated in this particular embodiment, the SMA actuators 54, and more particularly, the SMA wires 112 coupled to the ball-screw bearing ring 106 provide pitch control aeroelastically and when actuated. To provide heating to the SMA wires 112, one or more electrical supply connectors (not shown) may be configured in cooperation with the SMA actuators 54. During actuation, the SMA actuators 54 undergo a change in length when under the influence of heating/cooling thereby causing the linear movement of the ball-screw bearing ring 106 and resulting rotational movement of the joint rod 42.

Figure 17:
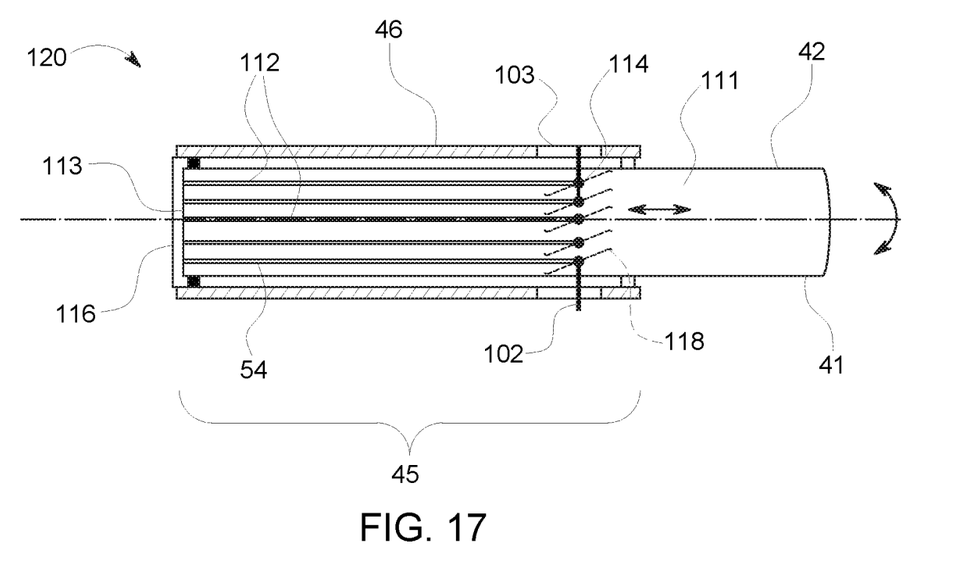
FIG. 17 is a schematic representation of another embodiment of an actuation system, in accordance with one or more embodiments shown or described herein.

Turning to FIG. 17, shown therein a partial schematic cross sectional view of a fifth preferred embodiment of a system for wind turbine actuation 120 in accordance with an example of the present technology. It is noted that unless otherwise indicated, the fifth preferred embodiment of the system for wind turbine actuation includes the same components identified during the description of the previously described embodiments. More particularly, illustrated in the embodiment of FIG. 17 is a portion of the system for wind turbine actuation intended for disposing in a plurality of blade segments, such as previously described first blade segment 30 and second blade segment 32 (FIG. 2). In the illustrated embodiment, a coupling component 41, and more particularly a joint rod 42, is illustrated and extends lengthways from the first blade segment (not shown) for structurally connecting with the second blade segment (not shown). Similar to the previous embodiment, in a non-limiting example, the joint rod 42 is configured as a tubular-like structure and oriented in a span-wise direction. The joint rod 42 is illustrated as disposed in a cartridge 46. It should be noted that the cartridge 46 is shown in cross-sectional view, while the joint rod 42 is not shown in cross-section so that the exterior surface of the joint rod 42 is illustrated.

The system for wind turbine actuation 120 further comprises a thermal actuation component 45 that is actuated in response to a change in thermal conditions so as to provide for pitch control to a turbine blade. In this particular embodiment, the thermal actuation component 45 comprises, a bearing, or coupling, component 102 configured to include pins and/or roller bearings in a manner to provide coupling of the joint rod 42 to the cartridge 46. The bearing component 102 is coupled to the joint rod 42 and the cartridge 46 so as to provide support to the joint rod 42. The bearing component 102 is supported in the cartridge 46 wall via one or more linear tracks or slots 103. In this particular embodiment, the bearing component 102 is configured as a slideable star shaped component that couples the joint rod 42 and the cartridge 46 in the rotational direction and actuates the torsion motion by shifting axially. A plurality of spiral raceways 118, or slots, are defined in an exterior surface 111 of the joint rod 42 and in cooperative arrangement with the bearing component 102. The bearing component 102, disposed in cooperative arrangement with the spiral raceway 118, acts as a mechanical linear actuator that translates linear motion of the bearing component 102 to rotational motion of the joint rod 42.

In the illustrated embodiments, the cartridge 46 is configured to provide for disposing of the joint rod 42 therein, and configuring the bearing component 102 in cooperative engagement with the linear tracks/slots 103 in the cartridge 46 so as to translate linear motion of the bearing component 102 to rotational motion of the joint rod 42. To provide for the linear motion of the bearing component 102, one or more SMA actuators 54 are coupled thereto. In this particular embodiment, each of the one or more SMA actuators 54 is generally comprised of a plurality of SMA wires, or packets, 112. In the illustrated embodiment, each of the wires 112 is coupled at a first end 113 to a plate 116, such as a mounting flange 52 (FIG. 3) or other stable component, and at a second end 114 to the bearing component 102. During actuation, the wire 112 in response to temperature change, lengthens or shortens, thereby causing the bearing component 102 to translate linearly, closer to or further from the plate 116, so as to result in rotational motion of the joint rod 42 and thereby allowing for control of the pitch action. In an embodiment, a return-spring actuator (not shown), generally similar to the return-spring actuator 79 of FIG. 10 provides a return actuation of the bearing component 102 by acting against the SMA actuators 54 and thereby providing the preload.

The resulting linear movement of the bearing component 102 provides for pitch rotation of the joint rod 42 and thus the first blade segment 30 relative to the second blade segment 32. As previously described with regard to FIG. 12, in an embodiment the joint rod 42 may be fixedly coupled to the second blade segment 32 via one or more attachment elements to provide for radial and axial alignment of the joint rod 42. The bearing component 102 provides for integration of radial and axial support with rotational actuation.

As previously disclosed, the use of SMAs provides for control of blade loads during extreme events. The SMA actuators 54 provide for control of such tasks. As illustrated in this particular embodiment, the SMA actuators 54, and more particularly, the SMA wires 112 coupled to the bearing component 102 provide pitch control aeroelastically and when actuated. To provide heating to the SMA wires 112, one or more electrical supply connectors (not shown) may be configured in cooperation with the SMA actuators 54. During actuation, the SMA actuators 54 undergo a change in length when under the influence of heating/cooling thereby causing the linear movement of the bearing component 102 and resulting rotational movement of the joint rod 42.

It should be understood that while specific embodiment configurations are described and illustrated, the interchangeability of various features from different embodiments is anticipated herein.

Advantageously, the present technology provides passive aero-elastic tailoring and pitch control of a wind turbine blade. Reliable, compact and lightweight actuators are needed for outboard blade actuation due to the harsh environment conditions (e.g., vibration, humidity, lightning strikes) and requirement of low weight to not cause inboard structural mass increases. The actuation system comprising one or more SMA actuators, as disclosed herein has the advantages of high power density and high reliability/availability (e.g., lack of moving parts, corrosion resistance, electrical activation). Actuation at the blade tip has high control authority to effectively impact loads with little system cost. The actuation systems disclosed herein avoid the use of expensive massive SMA torque tubes and the respective slow actuation due to thermal inertia and high heating current demand. The disclosed SMA actuators may be employed beneficially in a passively aeroelastic pitching blade tip arrangement, whereby a stiffness of an SMA spring or wire, or the length of a torque arm defining the coupling between bending load and pitch, can be changed depending on the atmospheric conditions. The SMA actuation system as disclosed here may be feasible for relatively seldom actuation, like adaptation to different wind conditions (e.g. shear, turbulence intensity (TI), potentially driven by day-night time or weather related changes of the atmospheric boundary layer). In this case, the twist distribution can be changed to, for example, unload the blade tip in situations in which critical gusts are more likely to occur. Alternatively, the twist distribution can be adapted to unload the blade tip when too high angles of attack drive up noise or make stall more likely.

Furthermore, the skilled artisan will recognize the interchangeability of various features from different embodiments. Similarly, the features described, as well as other known equivalents for each such feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A wind turbine blade comprising:
   a first blade segment and a second blade segment extending in opposite directions from a chord-wise joint, the first blade segment extending from the chord-wise joint to a blade tip, each of the blade segments having a pressure side shell member, a suction side shell member;
   a coupling component extending spanwise from within the first blade segment and forming a portion of the internal support structure of the first blade segment, the coupling component structurally connecting the first blade segment and the second blade segment; and a thermal actuation component disposed in one of the first blade segment or the second blade segment and coupled to the coupling component, the thermal actuation component actuated in response to a change in thermal conditions to rotate the coupling component about a pitch axis of the first blade segment to provide for aeroelastic tailoring and pitch control to the wind turbine blade, wherein the thermal actuation component comprises one of:

a cartridge disposed about the coupling component and including a plurality of spanwise spaced apart bearings and a plurality of (shape memory alloy) SMA actuators disposed in a tangential arrangement, therebetween a periphery of the coupling component and the cartridge, wherein a first bearing of the plurality of spanwise spaced apart bearings is disposed adjacent a flange for mounting to the first blade segment and providing support to the first blade segment, and a second bearing of the plurality of spanwise spaced apart bearings is disposed to support one or more of the plurality of SMA actuators;

a plurality of spanwise spaced apart bearings disposed about the coupling component, a plurality of torque arms coupled to the coupling component, a plurality of attachment blocks coupled to the coupling component and a plurality of SMA actuators, each of the plurality of SMA actuators coupled to one of the plurality attachment blocks at a first end and to one of the of plurality of torque arms at a second end;

a bearing disposed about the coupling component, a holding block spaced spanwise a distance from the bearing and fixedly attached to the coupling component and at least one SMA actuator, spirally wound about the coupling component between the bearing and the holding block;

a ball-screw bearing coupled to the coupling component and supporting the coupling component, the ball-screw bearing comprising a ball-screw bearing ring including a plurality of ball bearings in cooperative arrangement with a helical raceway to define a mechanical linear actuator that translates linear motion of the ball-screw bearing ring to rotational motion of the coupling component; and a bearing component coupled to the coupling component and supporting the coupling component, the bearing component disposed in cooperative arrangement with a spiral raceway formed into an exterior surface of the coupling component and a slot formed in the cartridge to define a mechanical linear actuator that translates linear motion of the bearing component to rotational motion of the coupling component.

2. The wind turbine blade of claim 1, wherein the coupling component is one of a joint rod or a spar extension.

3. The wind turbine blade of claim 1, wherein the plurality of SMA actuators comprise at least one of an SMA coil spring and an SMA wire.

4. The wind turbine blade of claim 1, wherein the at least one SMA actuators comprises a single SMA wire.

5. The wind turbine blade of claim 1, wherein the at least one SMA actuator comprise a first SMA wire spirally wound about the coupling component in a first direction and a second SMA wire spirally wound about the coupling component in an opposed second direction.

6. The wind turbine blade of claim 1, wherein the ball-screw bearing further comprises one of a threaded shaft disposed about and coupled to the coupling component and defining the helical raceway for the ball bearings of the ball-screw bearing ring.

7. The wind turbine blade of claim 1, wherein the coupling component defines the helical raceway formed into an exterior surface of the coupling component for the ball bearings of the ball-screw bearing ring.

8. The wind turbine blade of claim 1, further comprising one or more electrical supply connectors operatively coupled to the at least one SMA actuator.

9. A wind turbine blade comprising:

a first blade segment and a second blade segment extending in opposite directions from a chord-wise joint, the first blade segment extending from the chord-wise joint to a blade tip, each of the blade segments having a pressure side shell member, a suction side shell member;

a joint rod extending spanwise from within the first blade segment and forming a portion of the internal support structure of the first blade segment, the joint rod structurally connecting the first blade segment and the second blade segment; and a thermal actuation component disposed in one of the first blade segment or the second blade segment and coupled to the joint rod, wherein the thermal actuation component comprises at least one shape memory alloy (SMA) actuator actuated in response to a change in thermal conditions to rotate the coupling component about a pitch axis of the first blade segment to provide for aeroelastic tailoring and pitch control to the wind turbine blade, wherein the thermal actuation component comprised one of:

a cartridge disposed about the joint rod and including a plurality of spanwise spaced apart bearings and a plurality of SMA actuators disposed in a tangential arrangement, therebetween a periphery of the joint rod and the cartridge, wherein a first bearing of the plurality of spanwise spaced apart bearings is disposed adjacent a flange for mounting to the first blade segment and providing support to the first blade segment, and a second bearing of the plurality of spaced apart bearings is disposed to support one or more of the plurality of SMA actuators;

a plurality of spanwise spaced apart bearings disposed about the joint rod, a plurality of torque arms coupled to the joint rod, a plurality of attachment blocks coupled to the joint rod and a plurality of SMA actuators, wherein each of the plurality of SMA actuators is coupled to one of the plurality attachment blocks at a first end and to one of the of plurality of torque arms at a second end;

a bearing disposed about the joint rod, a holding block spaced spanwise a distance from the bearing and fixedly attached to the joint rod and at least one SMA actuator comprising at least one SMA wire, spirally wound about the joint rod between the bearing and the holding block;

a ball-screw bearing coupled to the joint rod and supporting the joint rod, the ball-screw bearing comprising a ball-screw bearing ring including a plurality of ball bearings in cooperative arrangement with a threaded shaft disposed about and coupled to the joint rod and defining a helical raceway for the ball bearings of the ball-screw bearing ring or a helical raceway formed into an exterior surface of the joint rod for the ball bearings of the ball-screw bearing ring, the ball-screw bearing defining define a mechanical linear actuator that translates linear motion of the ball-screw bearing ring to rotational motion of the joint rod; and a bearing component coupled to the joint rod and supporting the joint rod, the bearing component disposed in cooperative arrangement with a spiral raceway formed into an exterior surface of the joint rod and a slot formed in the cartridge to define a mechanical linear actuator that translates linear motion of the bearing component to rotational motion of the joint rod.

10. The wind turbine blade of claim 9, wherein the plurality of SMA actuators comprise at least one of an SMA coil spring and an SMA wire.

11. The wind turbine blade of claim 9, wherein the plurality of ball bearings are in cooperative arrangement with one of a threaded shaft disposed about and coupled to the joint rod and defining the helical raceway for the ball bearings of the ball-screw bearing ring or the joint rod wherein the helical raceway is formed into an exterior surface of the joint rod for the ball bearings of the ball-screw bearing ring.

12. A wind turbine blade comprising:
a first blade segment and a second blade segment extending in opposite directions from a chord-wise joint, the first blade segment extending from the chord-wise joint to a blade tip, each of the blade segments having a pressure side shell member, a suction side shell member;

a coupling component extending spanwise from within the first blade segment and forming a portion of the internal support structure of the first blade segment, the coupling component structurally connecting the first blade segment and the second blade segment; and a thermal actuation component disposed in one of the first blade segment or the second blade segment and coupled to the coupling component, wherein the thermal actuation component comprises one of:

a cartridge disposed about the coupling component and including a plurality of spanwise spaced apart bearings and a plurality of SMA actuators, wherein the plurality of SMA actuators comprise at least one of an SMA coil spring and an SMA wire, disposed in a tangential arrangement, therebetween a periphery of the coupling component and the cartridge to rotate the coupling component about a pitch axis of the first blade segment in response to a change in thermal conditions to provide for aeroelastic tailoring and pitch control to the wind turbine blade, wherein a first bearing of the plurality of spanwise spaced apart bearings is disposed adjacent a flange for mounting to the first blade segment and providing support to the first blade segment, and a second bearing of the plurality of spanwise spaced apart bearings is disposed to support one or more of the plurality of SMA actuators;

a plurality of spanwise spaced apart bearings disposed about the coupling component, a plurality of torque arms coupled to the coupling component, a plurality of attachment blocks coupled to the coupling component and a plurality of SMA actuators, wherein the plurality of SMA actuators comprise at least one of an SMA coil spring and an SMA wire and wherein each of the plurality of SMA actuators is coupled to one of the plurality attachment blocks at a first end and to one of the of plurality of torque arms at a second end to rotate the coupling component about a pitch axis of the first blade segment in response to a change in thermal conditions to provide for aeroelastic tailoring and pitch control to the wind turbine blade;

a bearing disposed about the coupling component, a holding block spaced spanwise a distance from the bearing and fixedly attached to the coupling component and at least one SMA actuator comprising at least one SMA wire, spirally wound about the coupling component between the bearing and the holding block to rotate the coupling component about a pitch axis of the first blade segment to provide for aeroelastic tailoring and pitch control to the wind turbine blade;

a ball-screw bearing coupled to the coupling component and supporting the coupling component, the ball-screw bearing comprising a ball-screw bearing ring including a plurality of ball bearings in cooperative arrangement one of a threaded shaft disposed about and coupled to the coupling component and defining a helical raceway for the ball bearings of the ball-screw bearing ring or a helical raceway formed into an exterior surface of the coupling component for the ball bearings of the ball-screw bearing ring, the ball-screw bearing defining a mechanical linear actuator that translates linear motion of the ball-screw bearing ring to rotational motion of the coupling component to rotate the coupling component about a pitch axis of the first blade segment in response to a change in thermal conditions to provide for aeroelastic tailoring and pitch control to the wind turbine blade; and a bearing component coupled to the coupling component and supporting the coupling component, the bearing component disposed in cooperative arrangement with a spiral raceway formed into an exterior surface of the coupling component and a slot formed in the cartridge to define a mechanical linear actuator that translates linear motion of the bearing component to rotational motion of the coupling component about a pitch axis of the first blade segment in response to a change in thermal conditions to provide for aeroelastic tailoring and pitch control to the wind turbine blade.

* * * * *